US009116817B2

United States Patent
Meier

(10) Patent No.: US 9,116,817 B2
(45) Date of Patent: Aug. 25, 2015

(54) POINTER CHASING PREDICTION

(71) Applicant: Apple Inc., Cupertino, CA (US)

(72) Inventor: Stephan G. Meier, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 156 days.

(21) Appl. No.: 13/890,716

(22) Filed: May 9, 2013

(65) Prior Publication Data

US 2014/0337581 A1 Nov. 13, 2014

(51) Int. Cl.
*G06F 9/38* (2006.01)
*G06F 12/08* (2006.01)
*G06F 9/00* (2006.01)

(52) U.S. Cl.
CPC .............. *G06F 12/0862* (2013.01); *G06F 9/00* (2013.01); *G06F 9/3836* (2013.01); *G06F 9/3842* (2013.01); *G06F 12/0875* (2013.01)

(58) Field of Classification Search
CPC ............ G06F 12/0847; G06F 12/0862; G06F 9/3842; G06F 9/3836
USPC .................................................. 711/123, 137
See application file for complete search history.

(56) References Cited

U.S. PATENT DOCUMENTS

| | | | |
|---|---|---|---|
| 6,481,251 B1 | 11/2002 | Meier et al. | |
| 6,564,315 B1 * | 5/2003 | Keller et al. | 712/214 |
| 6,622,235 B1 * | 9/2003 | Keller et al. | 712/23 |
| 6,662,280 B1 * | 12/2003 | Hughes | 711/156 |
| 6,704,854 B1 * | 3/2004 | Meier et al. | 712/204 |
| 8,301,865 B2 | 10/2012 | Grohoski et al. | |
| 2008/0082794 A1 | 4/2008 | Yu et al. | |
| 2013/0298127 A1 * | 11/2013 | Meier et al. | 718/100 |
| 2013/0326198 A1 * | 12/2013 | Meier et al. | 712/216 |

* cited by examiner

*Primary Examiner* — Than Nguyen
(74) *Attorney, Agent, or Firm* — Rory D. Rankin; Meyertons, Hood, Kivlin, Kowert & Goetzel, P.C.

(57) ABSTRACT

A system and method for efficient scheduling of dependent load instructions. A processor includes both an execution core and a scheduler that issues instructions to the execution core. The execution core includes a load-store unit (LSU). The scheduler determines a first condition is satisfied, wherein the first condition comprises result data for a first load instruction is predicted eligible for LSU-internal forwarding. The scheduler determines a second condition is satisfied, wherein the second condition comprises a second load instruction younger in program order than the first load instruction is dependent on the first load instruction. In response to each of the first condition and the second condition being satisfied, the scheduler can issue the second load instruction earlier than it otherwise would. The LSU internally forwards the received result data from the first load instruction to address generation logic for the second load instruction.

20 Claims, 4 Drawing Sheets

Table 100

| Instructions in Program Order | Line Number | Location of Source Data for Load instruction | Changes in Scheduling |
|---|---|---|---|
| R13 ← LD 8(R30) | Line 1 | Source Data from Data Cache | |
| R19 ← R13 + R22 | Line 2 | | |
| 0(R30) ← ST R19 | Line 3 | | |
| R2 ← LD 8(R19) | Line 4 | Source Data from ALU adder or Store Queue | |
| R29 ← R13 + R2 | Line 5 | | |
| 4(R10) ← ST R29 | Line 6 | | |
| R11 ← LD 4(R2) | Line 7 | Source Data from Load Queue via D-Cache | |
| R19 ← R13 + R11 | Line 8 | | |
| 0(R30) ← ST R19 | Line 9 | | |
| R3 ← LD 8(R29) | Line 10 | Source Data from Store Queue (or ALU adder) | |
| R28 ← R3 + R5 | Line 11 | | |
| 4(R14) ← ST R28 | Line 12 | | |
| R25 ← LD 4(R3) | Line 13 | Source Data from Load Queue via D-Cache | |
| R6 ← R13 + R25 | Line 14 | | |
| 0(R1) ← ST R6 | Line 15 | | |
| R7 ← LD 8(R3) | Line 16 | Source Data from Load Queue via D-Cache | |
| R4 ← R11 + R7 | Line 17 | | |
| 4(R9) ← ST R4 | Line 18 | | |
| R10 ← LD 4(R7) | Line 19 | Source Data from Load Queue via D-Cache | Schedule early |
| R21 ← R10 + R10 | Line 20 | | |
| 4(R18) ← ST R21 | Line 21 | | |
| R16 ← LD 4(R10) | Line 22 | Source Data from Load Queue via D-Cache | Schedule early |
| R24 ← LD 4(R16) | Line 23 | Source Data from Load Queue via D-Cache | Schedule early |
| R27 ← LD 4(R24) | Line 24 | Source Data from Load Queue via D-Cache | Schedule early |

*FIG. 1*

POINTER CHASING PREDICTION

BACKGROUND OF THE INVENTION

1. Field of the Invention

This invention relates to computing systems, and more particularly, to efficient scheduling of speculative load instructions.

2. Description of the Relevant Art

The pipeline depth of modern microprocessors continues to increase in order to support higher clock frequencies and increased microarchitectural complexity. Despite improved device speed, higher clock frequencies of next-generation processors limit the levels of logic to fit within a single clock cycle. The deep pipelining trend has made it advantageous to predict the events that may happen in the pipe stages ahead. One example of this technique is latency speculation between an instruction and a younger (in program order) dependent instruction. These younger dependent instructions may be picked for out-of-order (o-o-o) issue and execution prior to a broadcast of the results of a corresponding older (in program order) instruction. Additionally, the deep pipelining trend increases a latency to receive and use load (read) operation result data.

One example of the above instruction dependency and latency speculation is a load-to-load dependency. A younger (in program order) load instruction may be dependent on an older (in program order) load instruction. The older load instruction that produces the result data may be referred to as the producing load instruction. The younger instruction dependent on the result data of the producing load instruction may be referred to as the consuming load instruction. When the target register of an older producing load (read) instruction is also an address register (source operand) of a younger consuming load instruction, the occurrence may be referred to as pointer chasing. Linked list traversals typically include frequent pointer chasing.

For load (read) instructions, the requested data may be retrieved from a cache line within a data cache. Alternatively, the requested data may be retrieved from a store queue, such as in the case when control logic determines whether a load-store dependency exists. Data forwarding of load results to dependent instructions may occur by sending the retrieved data to a reservation station and/or a register file. Afterward, the data may be sent to one or more execution units corresponding to the younger dependent instructions. The data forwarding incurs an appreciable delay. The traversal of one or more linked lists within a software application accumulates this delay and may reduce performance. The latency for receiving and using load instruction result data may vary depending on instruction order within the computer program. However, the shorter latency cases may not be taken advantage of within a pipeline despite a high frequency of occurrence of the shorter latency cases. The traversal of a linked list is one case that may allow an opportunity to decrease the latency to use load instruction result data.

In view of the above, methods and mechanisms for efficient scheduling of speculative load instructions are desired.

SUMMARY OF EMBODIMENTS

Systems and methods for efficient scheduling of speculative load instructions are contemplated. In various embodiments, a processor includes a data cache, an execution core that executes memory access instructions, and a scheduler that issues instructions to the execution core. The execution core includes a load-store unit (LSU). The scheduler determines a first condition is satisfied. The first condition comprises result data for a first load instruction is predicted to reside in the data cache, rather than reside in a store queue in the LSU. Additionally, the first condition may include a LSU-internal forwarding condition comprising the step of predicting the result data for the producing load instruction is available directly from the data cache. The scheduler determines a second condition is satisfied, the second condition comprising a second load instruction younger in program order than the first load instruction is dependent on the first load instruction. In response to each of the first condition and the second condition being satisfied, the scheduler issues the second load instruction prior to the result data being available. In doing so, a load-to-load latency may be reduced. The LSU forwards the result data received from the data cache to address generation logic used to generate an address for the dependent second load instruction. For a series of load-to-load dependencies, such as a traversal of a linked list, performance of an application may significantly increase.

The scheduler may be coupled to a load-store (LS) predictor for predicting store-to-load dependencies. The LS predictor may store an indication indicating whether a store instruction with a dependent load instruction has already received result data. Therefore, the LS predictor predicts store-to-load dependencies whether or not the result data is already received within a store queue within the LSU. In order to determine result data for the first load instruction is not from a store queue within the LSU, and is predicted to reside in the data cache, the scheduler may determine the second load instruction has no allocated entry in the LS predictor. Should the result data be unavailable for the second load instruction when the second load instruction is ready for address generation, the second load instruction may be replayed.

These and other embodiments will be further appreciated upon reference to the following description and drawings.

BRIEF DESCRIPTION OF THE DRAWINGS

FIG. 1 is a generalized block diagram of one embodiment of a computer program with data dependencies between load instructions.

Figure 2:
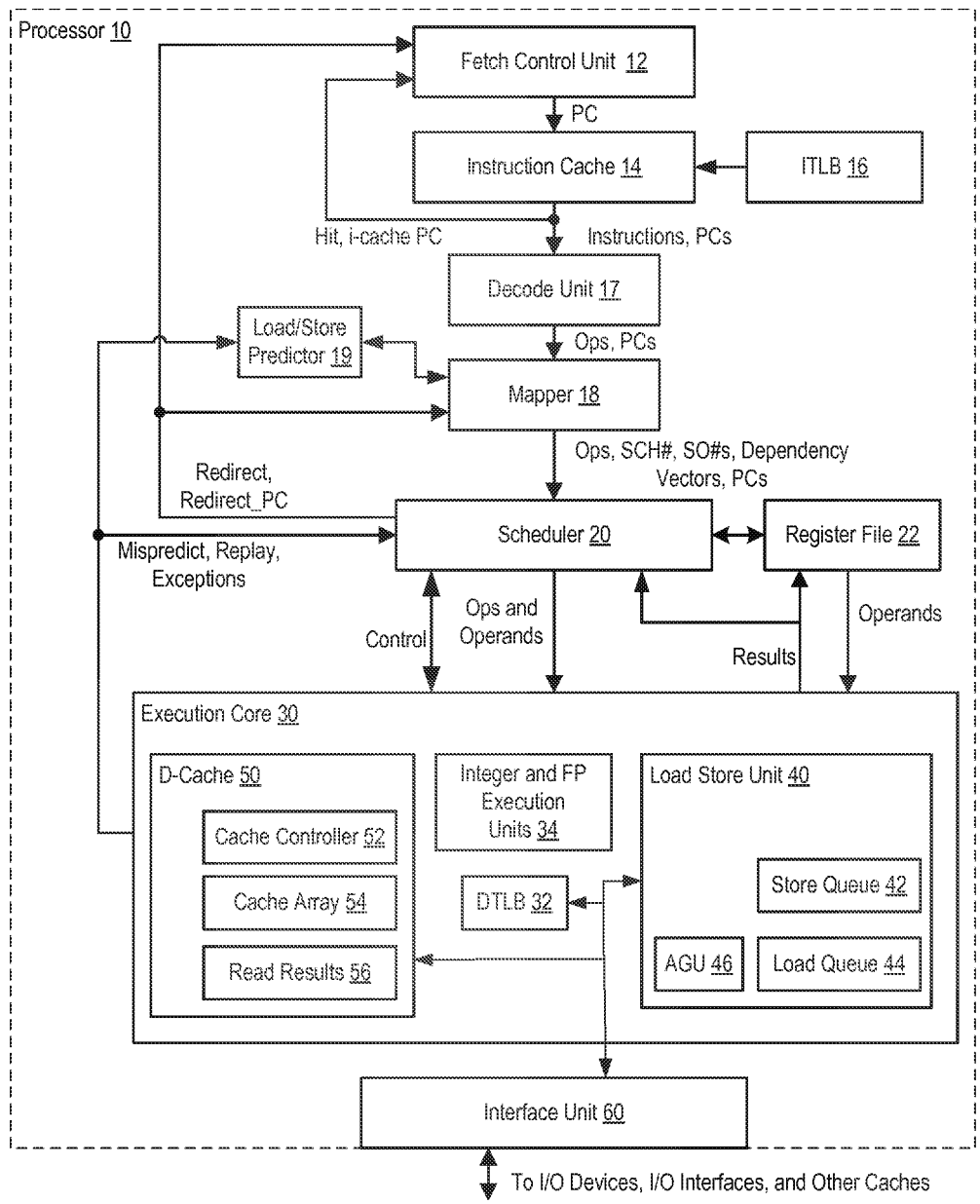
FIG. 2 is a generalized block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Referring to FIG. 1, one embodiment of identification of data dependencies between load instructions in computer code is shown. As used herein, the data dependencies between load instructions may also be referred to as load-to-load dependencies. Table 100 illustrates an example of computer program instructions with load instructions dependent on other instructions for source operand data. The source operand data is used to generate an address for a memory read access. The generated address may or may not be translated. Translation may comprise a virtual-to-physical mapping. Source operand data may contain an immediate integer value included within an instruction. In the example of the load instruction in line 1 of the table 100, the load instruction has an integer value of 8 as an immediate source operand. Another example of source operand data includes data stored in a register by the time execution of the instruction begins. An identifier (ID) within the instruction identifies the register.

Continuing with the example of the load instruction in line 1 of the table 100, the load instruction has a source register R30 that stores data to be used as source operand data by the time execution of the load instruction begins. An address is generated from an addition operation with the integer 8 and the contents stored in register R30. The generated address may be further translated. The data dependencies between load instructions are highlighted in table 100. Table 100 includes 24 lines of code numbered from line 1 to line 24. The lines of code include instructions presented in program order. In the example shown in table 100, the instructions include load, store and arithmetic addition instructions.

For a given load instruction, the result data may be retrieved from a cache line within a data cache. However, the result data for the given load instruction may already be in a processor and not need to be retrieved from the data cache using a corresponding generated address. For example, the result data may be in an entry in a store queue. The result data may be forwarded from the store queue within the processor to a destination register of the given load instruction. In this case, the result data is not retrieved from the data cache using the corresponding generated address. The forwarding within the processor of the result data may reduce the latency to obtain the result data for the given load instruction.

Similar to the above case of forwarding result data, the source operand data of the given load instruction may also be forwarded. The forwarding of source operand data may reduce the latency of the given load instruction and increase instruction throughput. The source operand data may be forwarded to a source register used by the given load instruction. The forwarding of the source operand data may occur in place of retrieving the source operand data from a register file. For example, the source operand data may be forwarded from an arithmetic logic unit (ALU) in an execution unit, an entry in the store queue, and so forth.

Additionally, the source operand data for the given load instruction may be forwarded directly from a cache pipeline stage. In such a case, the forwarding may occur within a load/store unit (LSU) on the processor after the source operand data is read out from a cache line in a cache array of a data cache. The source operand data for the given load instruction may be retrieved from the data cache due to execution an older (in program order) load instruction. Accordingly, the source operand data may be forwarded to the younger given load instruction within the LSU on the processor. Further details are provided later. In these cases, the given load instruction may be speculatively scheduled to issue early. Other conditions described later may also be checked prior to scheduling the given load instruction early. A predictor may be used to both speculate when data forwarding may be used and to select which source supplies the forwarded data.

In table 100, line 1 includes a load instruction with a source register denoted as R30. As described earlier, an address is generated from the addition operation using the integer 8 and the contents stored in register R30. The generated address may be additionally translated. If data forwarding is not used to obtain the result data, the contents of memory located at this generated address is retrieved from the data cache. Afterward, the retrieved contents of memory, which also may be referred to as the result data, are sent to the destination register. The load instruction in line 1 has a destination register denoted as R13. In some embodiments, each of the registers R13 and R30 are included in a register file.

Lines 2 and 3 in table 100 include an addition instruction and a store instruction, respectively. Each of these instructions is dependent on the load instruction in line 1. Therefore, the instructions in lines 2 and 3 may not be scheduled to issue until the result data is at least retrieved from the data cache and placed in an identified destination register within a register file and/or a reservation station.

The addition instruction in line 2 produces result data that is stored in the destination register R19 in the register file. This result data from the addition instruction is stored in the destination register R19. The result data produced by the addition instruction is also sent to memory for storage by the store instruction in line 3. The load instruction in line 4 utilizes the result data produced by the addition instruction in line 2 as source operand data. Therefore, a corresponding entry in a reservation station for the load instruction in line 4 may receive the result data forwarded from an arithmetic logic unit (ALU). This result data is to be used as source operand data by the load instruction in line 4. The load instruction in line 4 receives source operand data that is in the processor. The latency of the load instruction in line 4 may be reduced due to using forwarded data from the ALU rather than reading data from the register file.

Table 100 illustrates from where the source operand data is sourced for address generation for load instructions. For example, the load instruction in line 7 uses for address generation the data to be stored in the source register denoted as R2. This data is produced by the load instruction in line 4. The producers of source operand data for load instructions are illustrated in table 100, such as in lines 1, 4, 7, 10, 13, 16, 19 and 22-24.

Moving to line 19 in table 100, the producer of the source operand data stored in register R7 for the load instruction at line 19 is an older (in program order) load instruction at line 16. The older load instruction at line 16 utilizes register R7 as a destination register. The result data for the older load instruction at line 16 is retrieved from the data cache at the location indicated by "8(R3)". The address for the load instruction in line 16 is generated from the addition operation between the integer 8 and the data stored in source register R3. In some embodiments, the generated address is translated. The result data stored in a location in the data cache identified by the generated address is retrieved. This result data may be sent to a register file and stored in the register R7 in the register file. Additionally, this result data may be stored in a corresponding entry in a reservation station.

After the above steps, the load instruction at line 19 may be issued and the result data may be sent to an adder to generate an address for the load instruction at line 19. The adder may be located in an ALU within an integer execution unit. Alternatively, the adder may be located within the LSU. The latency for obtaining and using the result data to be stored in the register R7 may incur an appreciable delay. Long transmission lines, repeater buffers, and staging storage elements may be used to transport the result data from the data cache to the register file. Forwarding the result data to the corresponding entry in the reservation station may reduce the latency. However, the on-die real estate layout may still appreciably affect the latency.

Continuing with the above example, the result data produced by the load instruction at line 16 may be sent from read out storage elements in the data cache directly to an adder. The adder may be used to generate an address for the load instruction at line 19 by adding the integer 4 to the data stored in the read out storage elements. If the adder is included within the LSU, then this type of forwarding occurs within the LSU, rather than across the die of the processor. The load-to-load latency may be appreciably reduced. Accordingly, the load instruction at line 19 may be scheduled to issue early. For example, in some processor designs, the load-to-load latency may be 4 clock cycles. However, the load-to-load latency may be 3 or less clock cycles when the result data produced by the older load instruction is from a data cache hit and the result data is forwarded within the LSU to the younger, dependent load instruction.

Similar to the above example regarding the load instruction at line 19, the younger dependent load instructions at lines 22-24 in table 100 may be scheduled early. The load instructions at lines 19 and 22-24 may be scheduled to issue prior to the result data is stored in a corresponding entry in a reservation station or a scheduler. The load instructions may be scheduled prior to the result data being available within the LSU. For each of these load instructions, the result data produced by an older load instruction may be forwarded within the LSU. This local forwarding may appreciably reduce the load-to-load latency.

Each of the load instructions at lines 19 and 22-24 satisfy conditions for being scheduled to issue early and reduce the load-to-load latency. For example, each of these load instructions is dependent on an older load instruction, rather than an arithmetic operation, a store operation or other operation. Additionally, another condition may be a corresponding older load instruction receives or is scheduled to receive the result data from a data cache hit, rather than from the store queue. Determining the conditions are satisfied for early scheduling of load instructions may utilize preexisting logic in the processor. Further details are provided later. The load instructions at lines 19 and 22-24 may correspond to a traversal of one or more linked lists within a software application. Reducing the load-to-load latency may improve processor performance for processing the instructions of the application.

The load instructions at lines 1, 4, 7, 10, 13 and 16 do not satisfy the conditions described above. Accordingly, these load instructions are not scheduled to issue early as described above. The load instructions at lines 1, 4 and 10 are not dependent on an older load instruction. The source operand data for the load instructions at lines 7, 13 and 16 are dependent on older load instructions that receive or are scheduled to receive result data from a source other than a data cache hit. For example, the source may be the store queue. Next, a description of the components of a processor used to determine the conditions for allowing early scheduling and thus reducing the load-to-load latency are provided.

Referring to FIG. 2, a generalized block diagram illustrating one embodiment of a processor 10 is shown. In the illustrated embodiment, the processor 10 includes a fetch control unit 12, an instruction cache 14, a decode unit 17, a mapper 18, a scheduler 20, a register file 22, an execution core 30, and an interface unit 60. As is well known in the art, the processor 10 may operate on multiple threads and include multiple cores, where each core includes the components shown in FIG. 2. A brief description of each of these components is provided here. A description of the execution core 30 including a load-store unit (LSU) 40 used for handling memory accesses is initially described. A description of the remaining components shown in processor 10 follows this description.

The execution core 30 may include a load-store unit (LSU) 40 for processing memory access operations, such as integer and floating-point load and store instructions and other types of memory reference instructions. The LSU 40 may access a data cache (d-cache) 50. The d-cache 50 may be a first level of a multi-level memory hierarchy. For example, the d-cache 50 may be a level one (L1) d-cache placed on the die. In some embodiments, the L1 d-cache may be placed within the execution core 30. In other embodiments, the L1 d-cache may be placed elsewhere in the processor 10. The d-cache 50 may include a cache controller 52 for receiving memory access requests and indexing the cache array 54. The cache array 54 may store data determined likely to be used again based on temporal and special locality. The cache array 54 may utilize a direct-mapped, a fully associative, or a set-associative storage arrangement. Both metadata and data that is read out of the cache array 54 may be stored in the read results 56. The read results 56 may utilize storage elements, such as flip-flops or latches. The LSU 40 may include logic for detecting data cache misses and to responsively request data from the multi-level memory hierarchy. For example, a miss request may go to a lower level of the memory hierarchy, such as at least a L2 data cache.

The actual computation of addresses for load/store instructions may take place within a computation unit in the execution core 30, such as in the integer and floating-point (FP) execution units 34. Although in other embodiments, the LSU 40 may implement dedicated address generation logic. For example, the LSU 40 may include the address generation unit (AGU) 46. In some embodiments, the LSU 40 may implement an adaptive, history-dependent hardware prefetcher configured to predict and prefetch data that is likely to be used in the future.

The LSU 40 may include load and store buffers configured to store issued but not-yet-committed load and store instructions for the purposes of coherency snooping and dependency checking for bypassing data. A load queue 44 may hold addresses of not-yet-committed load instructions. In some embodiments, the data corresponding to these addresses may also be stored in the load queue 44. In other embodiments, the data corresponding to these addresses may be sent on buses to other components on the processor. The data may arrive from the read results 56 in the d-cache 50 or from the store queue 42. The LSU 40 may include a miss buffer (not shown) configured to store outstanding loads and stores that cannot yet complete, for example due to cache misses.

A store queue 42 may hold addresses of not-yet-committed store instructions. The data corresponding to these addresses may be stored in the store queue 42. Alternatively, the corresponding data may be stored in a separate store buffer (not shown). Accessing the store queue 42 and forwarding data from the store queue 42 to a younger dependent load instruction 44 may consume an appreciable amount of time. In particular it may take longer than accessing the d-cache 50.

The store queue 42 and the load queue 44 maintain information for in-flight load and store instructions. A load instruction may have corresponding data from an older store instruction bypassed to it. The corresponding data may be stored in the store queue 42 prior to being written into the L1 d-cache. As load instructions enter the LSU 40, a dependency check may be performed for determining possible data bypass. The dependency check may comprise a content-addressable-memory (CAM) access of the store queue 42 to compare addresses between in-flight load and store instructions. When an address is resolved (generated and possibly translated) for a given load instruction, this address may be used to index the store queue 42. A match with an address stored in the store queue 42 in addition to a match with predetermined status and age information produces an access hit. A hit indicates data from an older store instruction may be bypassed from the store queue 42 to the load instruction. A corresponding read access of the d-cache 50 may be cancelled. A prediction of the access results may occur in an earlier pipeline stage. For example, a load/store (LS) predictor 19 may maintain prediction information for store-to-load (STL) forwarding.

The LS predictor 19 may store program counter (PC) address information of load instructions that have been previously found to be dependent on older store instructions. PC address information of the particular older store instruction may also be stored in a corresponding entry in the LS predictor 19. The LS predictor 19 may additionally store an indication indicating whether a given store instruction with a dependent load instruction has already received result data. Therefore, the LS predictor 19 maintains information for STL forwarding for both cases where the result data has not yet arrived in the store queue 42 for the store instruction and where the result data has already arrived in the store queue 42 for the store instruction. The LS predictor 19 may be used to predict whether a given load instruction receives source data from the L1 d-cache 50.

Continuing with the above description, when the PC address of a given load is used to access the LS predictor 19 and the PC address misses in the LS predictor 19, there may be high confidence that the source operand data for the given load instruction is not from the store queue 42, but rather from the L1 d-cache 50. Alternatively, an index may be generated for the given load instruction to use for accessing the LS predictor 19. For example, a portion of the PC address may be input to a hash function. Other information such as history information may also be input to the hash function to generate the corresponding index. The index generation may be similar to the logic used for branch prediction mechanisms. The given load instruction may be referred to as the producing load instruction. A younger load instruction may be dependent on the given load instruction. This younger, dependent load instruction may be referred to as the consuming load instruction.

Determining a load-to-load dependency between the producing load instruction and the consuming load instruction may occur prior to or during a register renaming pipeline stage in the processor 10. For example, the destination register of the producing load instruction may be determined to match the source register of the consuming load instruction. In addition, no intervening instruction between the producing and consuming load instructions modify or store the result data of the producing load instruction. Similarly, predicting the result data for the producing load instruction is from the d-cache 50 rather than from the store queue 42 may occur prior to or during the register renaming pipeline stage in the processor 10.

In response to both (i) determining the load-to-load dependency exists between the producing and consuming load instructions and (ii) a corresponding index for the producing instruction does not hit in the LS predictor 19, thus, predicting the producing load instruction receives its result data from the L1 d-cache 50, the consuming load instruction may be scheduled to issue from the scheduler 20 to the execution core 30 early prior to the source operand data is available. An LSU-internal forwarding condition may include the step of predicting the result data for the producing load instruction is available directly from the L1 d-cache 50. This result data for the producing load instruction is the source operand data for the consuming load instruction. The source operand data may be forwarded within the LSU 40 after the L1 d-cache hit for the producing load instruction. For example, the result data for the producing instruction may be sent from the read results 56 in the d-cache 50 to the AGU 46. The AGU 46 may use the received data for generating an address for the consuming load instruction. The producing and consuming instructions may be used in a pointer chasing scenario, such as a traversal of a linked list.

If the prediction is wrong, such as there is a L1 d-cache miss for the producing load instruction or the producing load instruction actually produces a CAM match hit in the store queue 42, then the consuming load instruction may be replayed. One or more instructions younger than the producing instruction may also be replayed. Depending on the replay logic, either all younger instructions are replayed or only younger instructions dependent on the producing load instruction are replayed.

In some embodiments, a further qualifying condition for issuing the consuming load instruction early may be a count of replays is below a given threshold. Either the scheduler 20, the LSU 40, or logic in the execution core 30 may maintain a respective count of replays for one or more detected consuming load instructions. The count may be for consecutive replays and reset when a prediction is correct. Alternatively, the count may be incremented for each replay and decremented for each correct prediction. Further, the count may be maintained over a given time period and the count is reset at the end of each time period. In response to logic determining a respective count has reached a given threshold, logic in the processor 10 may block an early issue of a corresponding consuming load instruction.

A further description of the remaining components in processor 10 now follows. In some embodiments, processor 10 may implement an address translation scheme in which one or more virtual address spaces are made visible to executing software. Memory accesses within the virtual address space are translated to a physical address space corresponding to the actual physical memory available to the system, for example using a set of page tables, segments, or other virtual memory translation schemes. In embodiments that employ address translation, each of the data caches and the instruction cache 14 may be partially or completely addressed using physical address bits rather than virtual address bits. For example, the caches may use virtual address bits for cache indexing and physical address bits for cache tags.

In order to avoid the cost of performing a full memory translation when performing a cache access, processor 10 may store a set of recent and/or frequently used virtual-to-physical address translations in a translation lookaside buffer (TLB), such as the data TLB (DTLB) 32 and the instruction TLB (ITLB) 16. During operation, each of the ITLB 16 and the DTLB 32 (which may be implemented as a cache, as a content addressable memory (CAM), or using any other suitable circuit structure) may receive virtual address information and determine whether a valid translation is present. If so, each of the ITLB 16 and the DTLB 32 may provide the corresponding physical address bits to a corresponding cache. It is noted that although ITLB 16 and DTLB 32 may perform similar functions, in various embodiments they may be implemented differently. For example, they may store different numbers of translations and/or different translation information.

Generally, each of the data caches, such as d-cache 50, and the instruction cache (i-cache) 14 may store one or more lines, each of which is a copy of data stored at a corresponding address in the system memory. As used herein, a "line" is a set of bytes stored in contiguous memory locations, which are treated as a unit for coherency purposes. As used herein, the terms "cache block", "block", "cache line", and "line" are interchangeable. In some embodiments, a cache line may also be the unit of allocation and deallocation in a cache. In some embodiments, each of the caches 14 and 26 may return one or more additional cache lines not yet requested when returning a first cache line that is requested. The instructions or data returned from this prefetch mechanism may be buffered for subsequent use.

The execution core 30 may include several computation units that perform arithmetic operations, bitwise logic operations, and detection of branch mispredictions. The execution core 30 may calculate and compare target addresses for branch operations, and generate addresses for memory access operations. These computation units are grouped within the integer and FP execution units 34 and not explicitly shown for ease of illustration. The execution core 30 may also be configured to detect various events during execution of ops that may be reported to the scheduler. Branch operations (ops) may be mispredicted, and some load/store ops may be replayed (e.g. for address-based conflicts of data being written/read). Various exceptions may be detected (e.g. protection exceptions for memory accesses or for privileged instructions being executed in non-privileged mode, exceptions for no address translation, etc.). The exceptions may cause a corresponding exception handling routine to be executed.

The fetch control unit 12 is coupled to provide a program counter address (PC) for fetching from the instruction cache 14. The instruction cache 14 is coupled to provide instructions (with PCs) to the decode unit 17, which is coupled to provide decoded instruction operations (ops, again with PCs) to the mapper 18. Relatively simple op generations (e.g. one or two ops per instruction) may be handled in hardware while more extensive op generations (e.g. more than three ops for an instruction) may be handled in micro-code. In addition, the fetch control unit 12 may handle branch prediction algorithms.

The mapper 18 is coupled to provide ops, a scheduler number (SCH#), source operand numbers (SO#s), one or more dependency vectors, and PCs to the scheduler 20. The mapper 18 may implement register renaming to map source register addresses from the ops to the source operand numbers (SO#s) identifying the renamed source registers. Additionally, the mapper 18 may be configured to assign a scheduler entry to store each op, identified by the SCH#. In one embodiment, the SCH# may also be configured to identify the rename register assigned to the destination of the op. In other embodiments, the mapper 18 may be configured to assign a separate destination register number. The mapper 18 may be configured to generate dependency vectors for the op. The dependency vectors may identify the ops on which a given op is dependent. The mapper 18 may provide the ops, along with SCH#, SO#s, PCs, and dependency vectors for each op to the scheduler 20.

The scheduler 20 is coupled to receive replay, mispredict, and exception indications from the execution core 30. In addition, the scheduler 20 may be coupled to provide a redirect indication and redirect PC to the fetch control unit 12 and the mapper 18, provide ops for execution to the execution core 30 and is coupled to the register file 22. The register file 22 is coupled to provide operands to the execution core 30, and is coupled to receive results to be written from the execution core 30. The register file 22 may generally include any set of registers usable to store operands and results of ops executed in the processor 10. In other embodiments, processor 10 may utilize reservation stations as part of a scheduling mechanism. For example, reservation stations may be utilized on a per execution unit basis. These and other embodiments are possible and are contemplated.

The execution core 30 is coupled to the interface unit 60, which is further coupled to an external interface of the processor 10. The external interface may include any type of interconnect (e.g. bus, packet, etc.). The external interface may be an on-chip interconnect, if the processor 10 is integrated with one or more other components (e.g. a system on a chip configuration). The external interface may be on off-chip interconnect to external circuitry, if the processor 10 is not integrated with other components. It is contemplated that processor 10 may implement any suitable instruction set architecture (ISA), such as, e.g., the ARM™, PowerPC™, or x86 ISAs, or combinations thereof.

Figure 3:
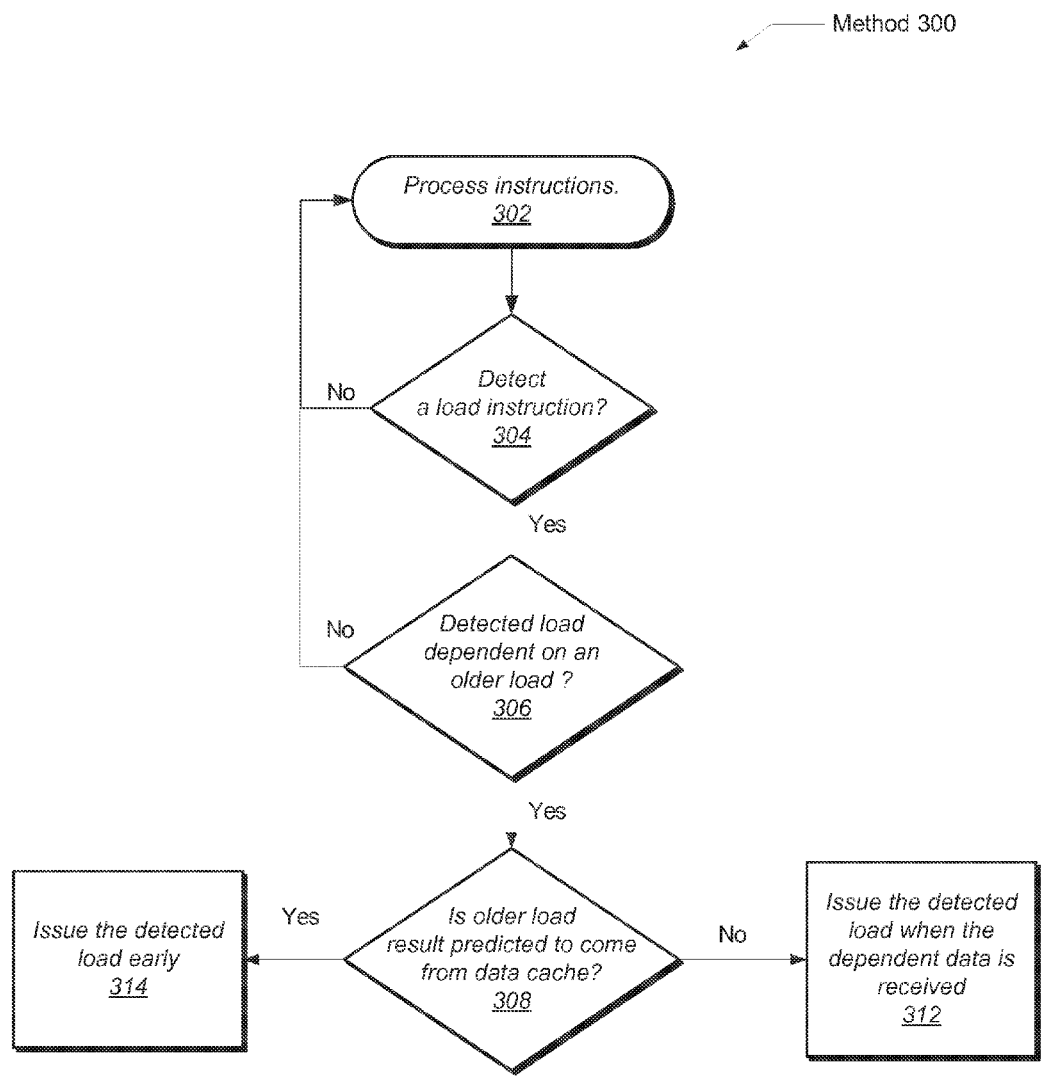
FIG. 3 is a generalized flow diagram of one embodiment of a method for efficient scheduling of speculative load instructions.

Referring now to FIG. 3, a generalized flow diagram of one embodiment of a method 300 for efficient scheduling of speculative load instructions is shown. The components embodied in processor 10 may generally operate in accordance with method 300. For purposes of discussion, the steps in this embodiment are shown in sequential order. However, in other embodiments some steps may occur in a different order than shown, some steps may be performed concurrently, some steps may be combined with other steps, and some steps may be absent.

In block 302, a processor may be processing instructions of one or more software applications. The processor fetches instructions of one or more software applications. In various embodiments, these fetched instructions may be decoded, renamed and allocated in a scheduler where they are later issued to an execution core. The processing may occur concurrently for one or more threads.

For a given thread, if the processor detects a load instruction (conditional block 304), then in 306, logic in the processor determines whether the detected load is dependent on an older load instruction. For example, a decode unit and a mapper in the processor may perform this determination. In block 308, logic in the processor predicts whether the result data of the older load instruction, which may also be referred to as the producing load instruction, is sourced from the data cache (i.e., the result data is predicted to be resident in the data cache). For example, a hash function may receive at least a portion of the PC address for the producing load instruction and generate an index. The index may be used to access a load-store (LS) predictor used to find store-to-load (STL) forwarding cases. If the index does not hit in the LS predictor, then in one embodiment it may be assumed that the result data for the producing load instruction is from the data cache.

In some embodiments, the steps in blocks 306 and 308 may occur in the same pipeline stage. The window of instructions to simultaneously process in a clock cycle may include the producing and the consuming load instructions. For a traversal of a linked list, the producing and consuming load instructions may be located near one another in the compiled computer program. If either one of the conditions determined in blocks 304 and 306 is not satisfied, then processing may resume with block 302. In conditional block 308, if the result data for the older load is not predicted to be in the data cache, then in block 312, the detected load instruction is not issued early in order to receive source operand data early from the data cache. Rather, the detected load instruction may be issued when the source operand data is ready and received. For example, the source operand data may be forwarded from the store queue or an ALU component to an entry in the scheduler or a reservation station. Additionally, the source operand data is written to a register file. If forwarding is not used, the source operand data may be read from the register file for the detected load instruction. Alternatively, if in block 308 the result data for the older load is predicted to be in the data cache, then in block 314, the detected load instruction may be issued early (i.e., prior to the source operand data being available). The early issue may reduce the load-to-load latency. The detected load instruction may receive the source operand data in the LSU.

Figure 4:
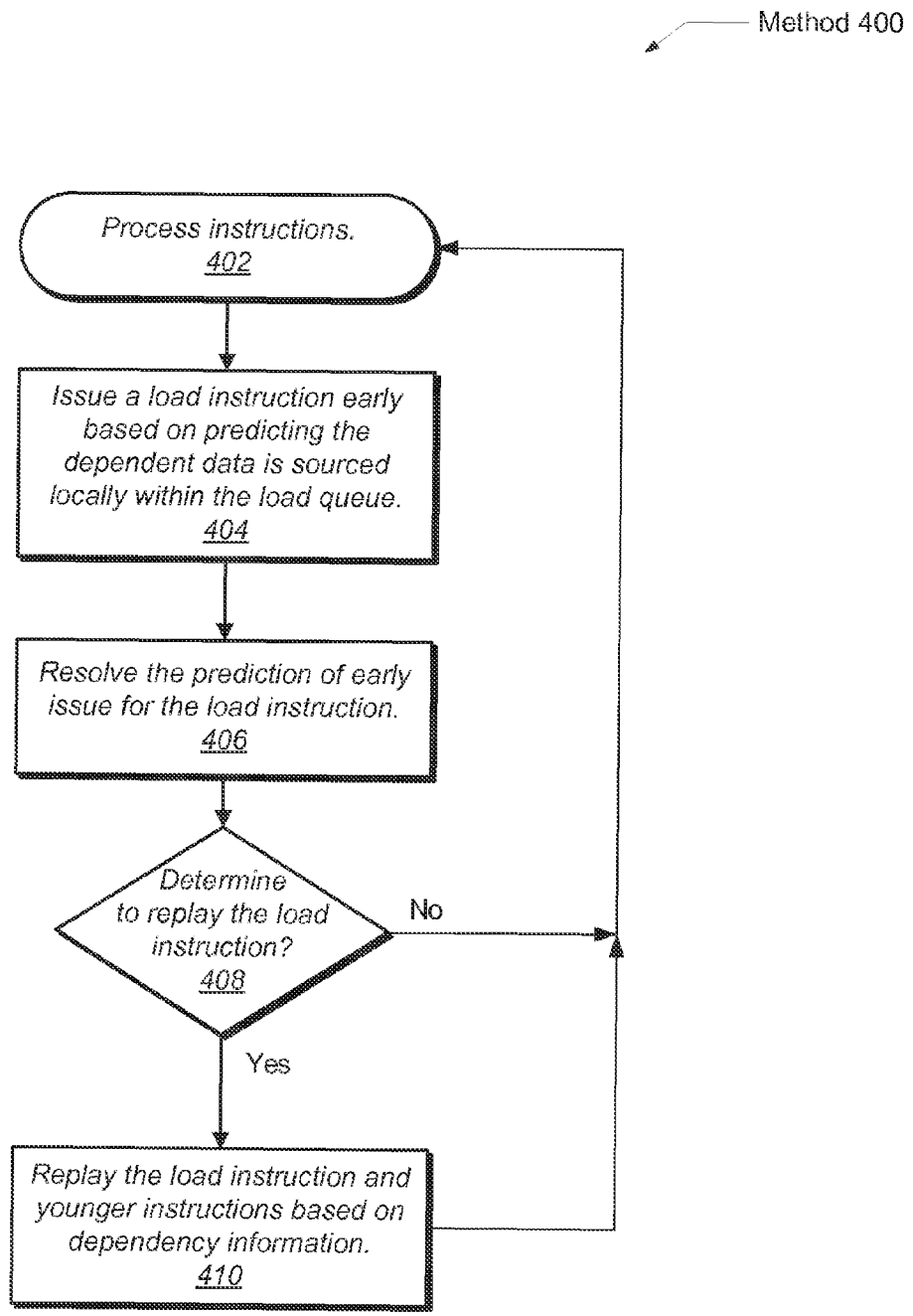
FIG. 4 is a generalized flow diagram of one embodiment of a method for executing early scheduled speculative load instructions.

Turning now to FIG. 4, a generalized flow diagram of one embodiment of a method 400 for executing early scheduled speculative load instructions is shown. The components embodied in processor 10 may generally operate in accordance with method 400. For purposes of discussion, the steps in this embodiment are shown in sequential order. However, in other embodiments some steps may occur in a different order than shown, some steps may be performed concurrently, some steps may be combined with other steps, and some steps may be absent.

In block 402, a processor may be processing instructions of one or more software applications. In block 404, the processor may issue a load instruction early based on predicting that the source operand data, which may also be referred to as the dependent data, will be sourced locally within the LSU from the data cache. The prediction may be based on conditions, such as the conditions described for method 300. In block 406, the prediction to issue the load instruction early may be resolved. For example, the early issued load instruction may be the consuming load instruction. Each of the hit/miss status of an access of the L1 data cache and an access of the store queue for the older producing load instruction may be resolved.

A misspeculation of the scheduling of the producing load instruction may be due to the instruction hitting in the store queue or some other condition (such as an alignment restriction) making the early forwarding from the d-cache impossible. If a misspeculation is detected (conditional block 408), then in block 410, one or more instructions younger (in program order) than the producing load instruction are replayed. The consuming load instruction itself may or may not need to be replayed. In some embodiments, the dependency information may be used to select which younger instructions to replay. The dependency information may be used to cancel the younger dependent instructions in various locations throughout processor. In other embodiments, all younger instructions are replayed. The replay may also reset stored values in the scheduler, such as deasserting picked or issued status information.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
   a data cache;
   a load-store unit (LSU); and
   a scheduler, wherein the scheduler is configured to:
      determine whether a second load instruction is dependent on a first load instruction, the second load instruction being younger in program order than the first load instruction; and
      issue the second load instruction prior to result data corresponding to the first load instruction being available, in response to determining the second load instruction is dependent on the first load instruction and predicting the result data for the second load instruction is available from the data cache.

2. The processor as recited in claim 1, wherein predicting the result data for the second load instruction is available from the data cache comprises predicting the first load instruction misses on a store queue within the LSU.

3. The processor as recited in claim 2, wherein the scheduler is coupled to a load-store (LS) predictor configured to determine whether a load instruction is dependent on an older store instruction.

4. The processor as recited in claim 3, wherein to predict the first load instruction misses on the store queue, the scheduler is further configured to determine the first load instruction has no allocated entry in the LS predictor.

5. The processor as recited in claim 3, wherein the processor further comprises an execution core, and wherein in response to determining the result data is unavailable for the second load instruction when the second load instruction is ready to generate an address, each of the scheduler and the execution core is further configured to replay the second load instruction.

6. The processor as recited in claim 3, wherein in response to determining the result data is available for the second load instruction when the second load instruction is ready to generate an address, the LSU is further configured to forward the result data to a computation unit within the LSU for address generation.

7. The processor as recited in claim 6, wherein the scheduler is further configured to maintain a count of replays for the second load instruction.

8. The processor as recited in claim 7, wherein in response to determining a respective count for the second load instruction reaches a given threshold, the scheduler is further configured to block the issue of the second load instruction prior to result data corresponding to the first load instruction being available.

9. A method for efficient scheduling of load instructions executable by at least one processor in a computer system, the method comprising:
  determining whether a second load instruction is dependent on a first load instruction, the second load instruction being younger in program order than the first load instruction; and
  issuing the second load instruction prior to result data corresponding to the first load instruction being available, in response to determining the second load instruction is dependent on the first load instruction and predicting the result data for the second load instruction is available from the data cache.

10. The method as recited in claim 9, wherein predicting the result data for the second load instruction is available from the data cache comprises predicting the first load instruction misses on a store queue within a load-store unit (LSU).

11. The method as recited in claim 10, further comprising:
  determining whether a load instruction is dependent on an older store instruction; and
  storing information corresponding to the load instruction and the older store instruction in a load-store (LS) predictor.

12. The method as recited in claim 10, wherein to predict the first load instruction misses on the store queue, the method further comprises determining the first load instruction has no allocated entry in the LS predictor.

13. The method as recited in claim 10, wherein in response to determining the result data is unavailable for the second load instruction when the second load instruction is ready to generate an address, the method further comprises replaying the second load instruction within each of a scheduler and an execution core.

14. The method as recited in claim 13, further comprising replaying one or more instructions younger than the second load instruction within each of the scheduler and the execution core.

15. The method as recited in claim 13, further comprising maintaining a count of replays for the second load instruction.

16. The method as recited in claim 15, wherein in response to determining a respective count for the second load instruction reaches a given threshold, the method further comprises blocking the issue of the second load instruction prior to result data corresponding to the first load instruction being available.

17. A non-transitory computer readable storage medium storing program instructions operable to perform efficient scheduling of speculative load instructions, wherein the program instructions are executable to:
  determine a second load instruction is dependent on a first load instruction, the second load instruction being younger in program order than the first load instruction; and
  issue the second load instruction prior to result data corresponding to the first load instruction being available, in response to the second load instruction is dependent on the first load instruction and predicting the result data for the second load instruction resides in a data cache.

18. The non-transitory computer readable storage medium as recited in claim 17, wherein predicting the result data for the second load instruction resides in the data cache comprises predicting the first load instruction misses on a store queue within a load-store unit (LSU).

19. The non-transitory computer readable storage medium as recited in claim 18, wherein the program instructions are further executable to:
  determine whether a load instruction is dependent on an older store instruction; and
  store information corresponding to the load instruction and the older store instruction in a load-store (LS) predictor.

20. The non-transitory computer readable storage medium as recited in claim 19, wherein to predict the first load instruction misses on the store queue, the program instructions are further executable to determine the first load instruction has no allocated entry in the LS predictor.

\* \* \* \* \*